United States Patent
Goh et al.

(10) Patent No.: US 11,009,972 B1
(45) Date of Patent: May 18, 2021

(54) PORTABLE MOUSE FOR AN INFORMATION HANDLING SYSTEM

(71) Applicant: Dell Products L.P., Round Rock, TX (US)

(72) Inventors: Peng Lip Goh, Singapore (MY); Karthikeyan Krishnakumar, Austin, TX (US); Chia-Yuan Chang, New Taipei (TW)

(73) Assignee: Dell Prodcuts L.P., Round Rock, TX (US)

( * ) Notice: Subject to any disclaimer, the term of this patent is extended or adjusted under 35 U.S.C. 154(b) by 0 days.

(21) Appl. No.: 16/746,083

(22) Filed: Jan. 17, 2020

(51) Int. Cl.
*G06F 3/0354* (2013.01)
*G06F 1/16* (2006.01)

(52) U.S. Cl.
CPC ........ *G06F 3/03543* (2013.01); *G06F 1/1684* (2013.01); *G06F 1/1613* (2013.01)

(58) Field of Classification Search
CPC .......... G06F 3/017; G06F 3/02; G06F 3/0362; G06F 3/0304; G06F 3/03543; G06F 3/0346; G06F 3/03547; G06F 3/0202; G06F 3/016; G06F 3/0383; G06F 1/1684; G06F 1/1613; H01H 13/85; H01H 13/14; H01H 35/2614; H01H 2215/028; H01H 2003/323; H01H 13/00; H01H 2003/008; H01H 2227/034; G06G 2203/0333
See application file for complete search history.

(56) References Cited

U.S. PATENT DOCUMENTS

| 5,268,674 | A  | * | 12/1993 | Howard | G06F 3/03543 200/318 |
| 6,323,843 | B2 | * | 11/2001 | Giles | G06F 3/03543 345/163 |
| 6,333,735 | B1 | * | 12/2001 | Anvekar | G06F 3/03547 345/166 |
| 6,781,573 | B1 | * | 8/2004 | Honma | G06F 3/03543 345/157 |
| 6,933,925 | B1 | * | 8/2005 | Gibbons | G06F 3/03543 345/163 |
| 8,537,114 | B2 | * | 9/2013 | Ma | H01H 13/85 345/163 |
| 10,365,731 | B2 | | 7/2019 | Forde et al. | |
| 2002/0118174 | A1 | * | 8/2002 | Rodgers | G06F 3/03543 345/163 |
| 2002/0135559 | A1 | * | 9/2002 | Hou | G06F 3/03543 345/156 |

(Continued)

*Primary Examiner* — Christopher E Leiby
(74) *Attorney, Agent, or Firm* — Baker Botts L.L.P.

(57) ABSTRACT

A portable mouse, including a hinge assembly; a cantilever key plate arm rotationally coupled to the hinge assembly at a first end of the cantilever key plate arm, the cantilever key plate arm including: a plunger at a second end of the cantilever key plate arm, the second end opposite to the first end, the plunger including an end plate; a top cover that is positionally fixed with respect to the cantilever key plate arm; a compression spring coupled to the top cover such that the compression spring is positioned between a portion of the top cover and the end plate of the plunger; and a microswitch including a microswitch actuator, wherein the compressions spring exerts a first force on the end plate of the plunger such that the end plate of the plunger maintains contact with the microswitch actuator.

17 Claims, 8 Drawing Sheets

(56) References Cited

U.S. PATENT DOCUMENTS

| | | | |
|---|---|---|---|
| 2002/0171621 A1* | 11/2002 | Johnson | G06F 3/03543 345/156 |
| 2006/0181512 A1* | 8/2006 | Wang | G06F 3/03543 345/163 |
| 2007/0251810 A1* | 11/2007 | Corcoran | G06F 3/03543 200/276.1 |
| 2009/0009473 A1* | 1/2009 | Ho | G06F 3/03543 345/163 |
| 2011/0084905 A1* | 4/2011 | Chang | G06F 3/03543 345/163 |
| 2017/0220139 A1* | 8/2017 | Forde | G06F 3/03543 |
| 2018/0136728 A1* | 5/2018 | Unnikrishnan | H01H 13/85 |
| 2018/0260043 A1* | 9/2018 | Forde | G06F 3/017 |

* cited by examiner

PORTABLE MOUSE FOR AN INFORMATION HANDLING SYSTEM

BACKGROUND

Field of the Disclosure

The disclosure relates generally to a portable mouse of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, a user can use a computing mouse to interact with a display of an information handling system for such activities as gaming. Left and right key triggers of the gaming mouse can be formed from plastic with a fixed rigid hinged cantilevered arm. The triggering of a microswitch included by the mouse relies on the flexing/bending of the plastic arms when the user depresses on the arm. However, the user, to depress the arm, has to overcome the plastic spring back of the arm in order to flex the arm to press on the microswitch. Additionally, the microswitch itself has an actuation force to overcome. The higher force to trigger will slow down the user from "clicking" continuously and finger fatigue will set in during long usage. Furthermore, the plastic key plate structure cannot be accurately assembled with the microswitch actuator due to molding and assembly tolerances. This causes a small gap to exist between the key plate and the microswitch actuator. The small gap adds additional travel distance when the user presses on the key plate thus losing milliseconds during rapid firing game play.

SUMMARY

Innovative aspects of the subject matter described in this specification may be embodied in a portable mouse, comprising a hinge assembly; a cantilever key plate arm rotationally coupled to the hinge assembly at a first end of the cantilever key plate arm, the cantilever key plate arm including: a plunger at a second end of the cantilever key plate arm, the second end opposite to the first end, the plunger including an end plate; a top cover that is positionally fixed with respect to the cantilever key plate arm; a compression spring coupled to the top cover such that the compression spring is positioned between a portion of the top cover and the end plate of the plunger; and a microswitch including a microswitch actuator, wherein the compressions spring exerts a first force on the end plate of the plunger such that the end plate of the plunger maintains contact with the microswitch actuator.

These and other embodiments may each optionally include one or more of the following features. For instance, the compression spring exerts the first force on the plunger less than a threshold force to engage the microswitch actuator. The cantilever key plate arm is rotatable between a first positional state and a second positional state, wherein when the cantilever key plate is in the first positional state, the end plate of the plunger is a first distance from the microswitch, and when the cantilever key plate is in the second position state, the end plate of the plunger is a second distance from the microswitch, the first distance being greater than the second distance. The end plate of the plunger maintains contact with the microswitch actuator in the first positional state and the second positional state. When the cantilever key plate arm is in the first positional state, a distance between the end plate of the plunger and the microswitch is a height of the microswitch actuator. The microswitch actuator exerts a second force on the end plate of the plunger, the second force being greater than the first force that the compression spring exerts on the end plate of the plunger. The compression spring is located at the second end of the cantilever key plate arm. The compressions spring exerts the first force of approximately three gram-force (gf).

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Figure 1:
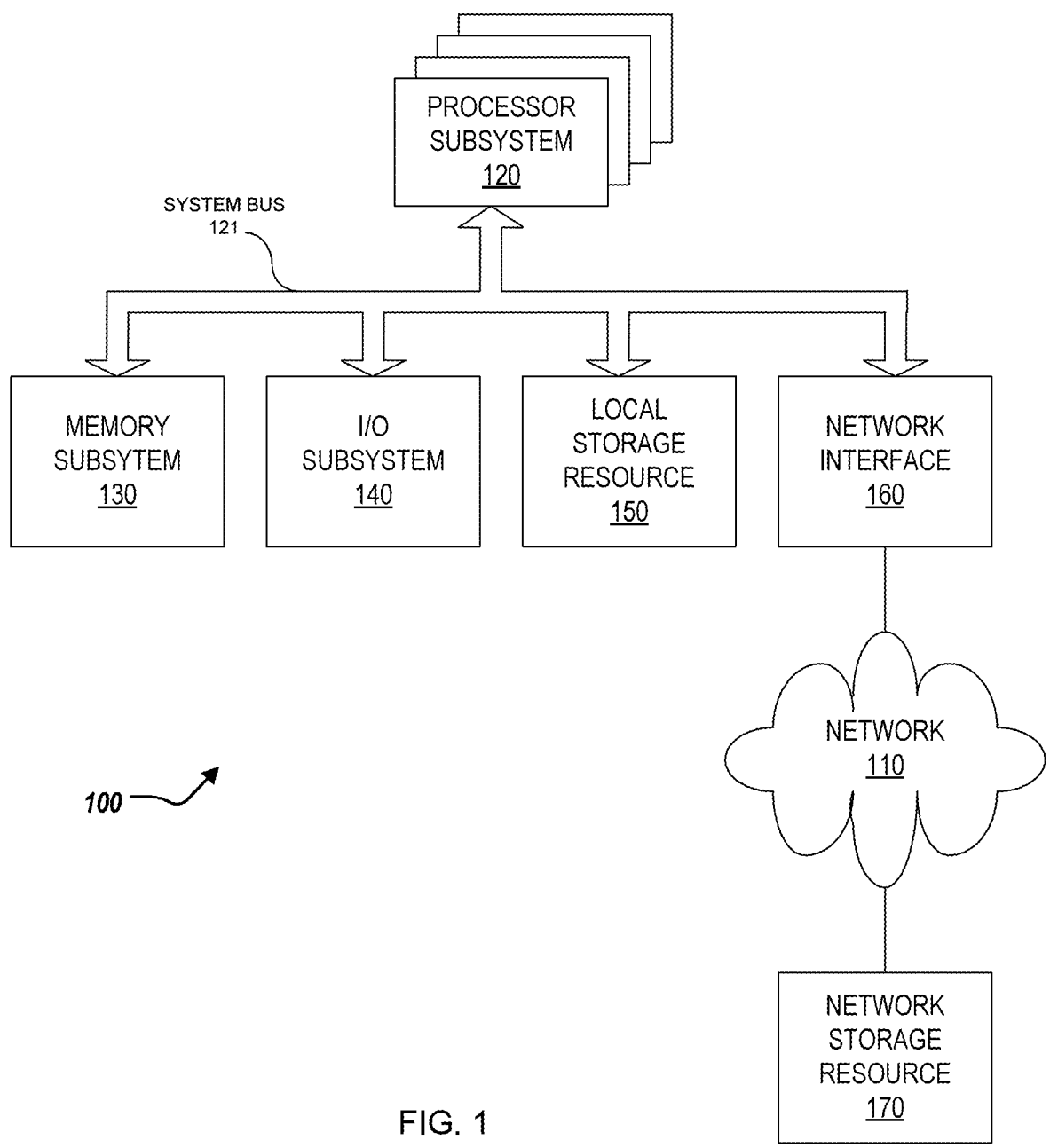
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
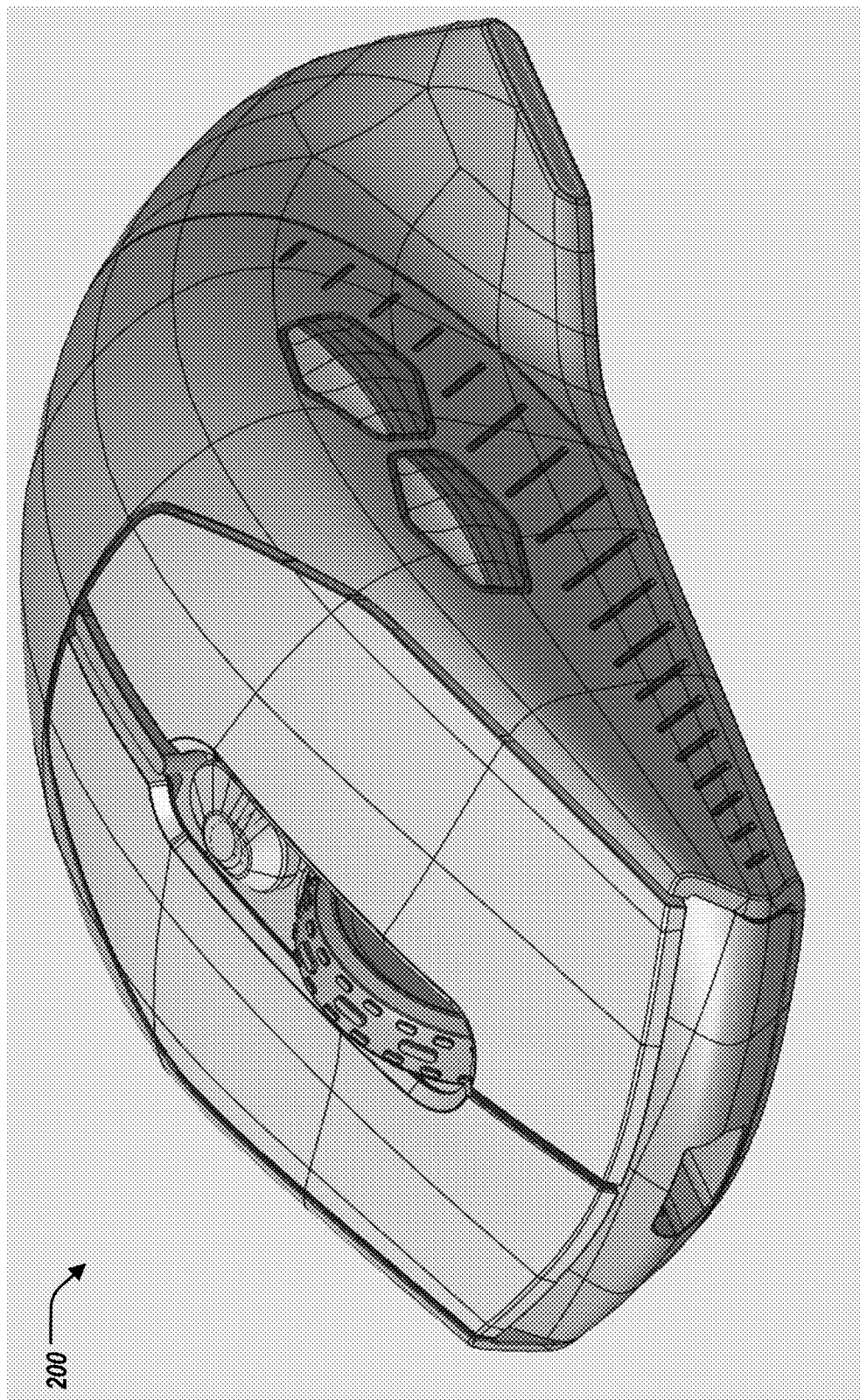
FIG. 2 illustrates a perspective view of a portable mouse used in coordination with the information handling system.

Turning to FIG. 2, FIG. 2 illustrates a perspective view of a portable mouse 200. The portable mouse 200 can be utilized as a part of information handling system 100, and specifically, the I/O subsystem 140 can represent the portable mouse 200.

Figure 3:
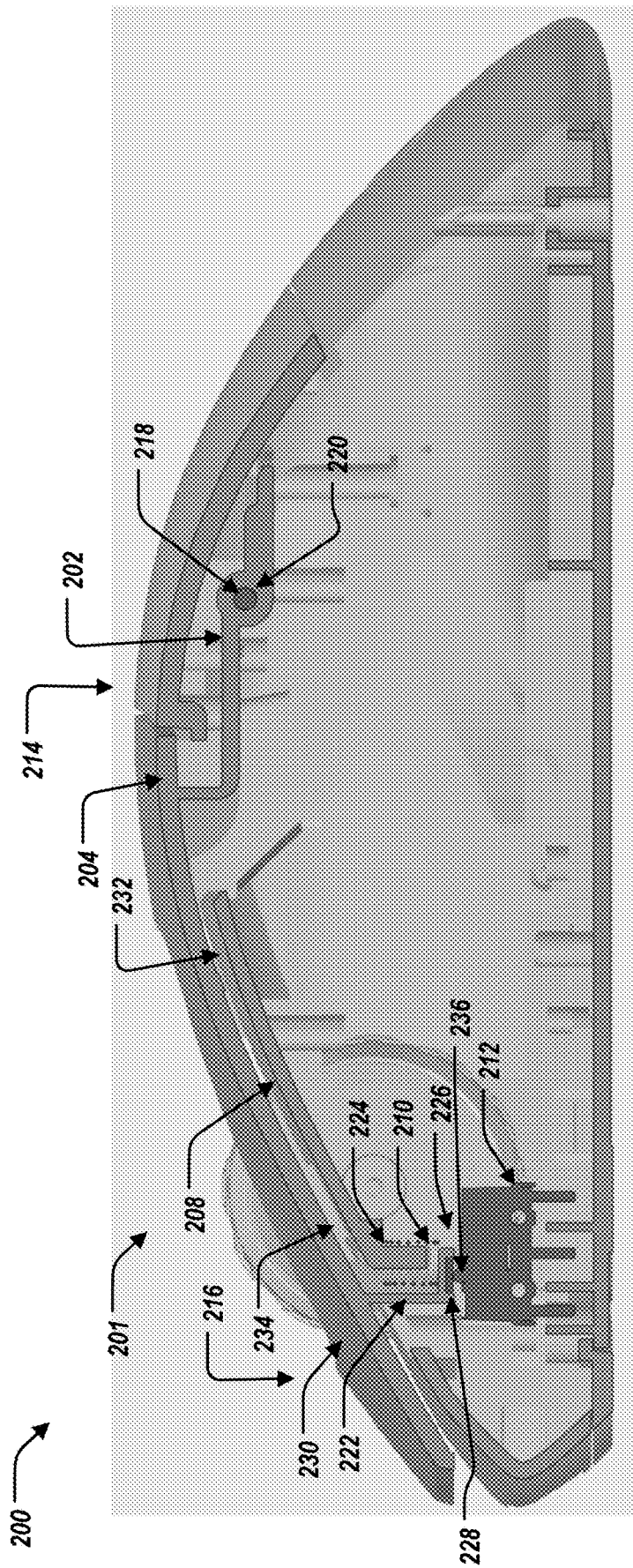
FIG. 3 illustrates a side cut-away view of the portable mouse, in a first positional state.

FIG. 3 illustrates a side cut-away view of the portable mouse 200. The portable mouse 200 can include a first mouse interaction mechanism 201 that includes a hinge assembly 202, a cantilever key plate arm 204, a plunger 222, a top cover 208, a compression spring 210, and a microswitch 212. In short, a user of the portable mouse 200 can depress the key plate arm 204 to engage the plunger 222 with the microswitch 212 ("click"). By doing so, the user is able to control/interact with an user interface element that is associated with the portable mouse 200 that is displayed by a display device, e.g., of the information handling system 100.

The cantilever key plate arm 204 can include a first end 214 and a second end 216. The second end 216 of the key plate arm 204 is opposite to the first end 214 of the key plate arm 204. The key plate arm 204 can be coupled to the hinge assembly 202, and specifically, the first end 214 of the key plate arm 204 can be coupled to the hinge assembly 202. The key plate arm 204 can be rotationally coupled to the hinge assembly 202. In other words, the key plate arm 204 is freely rotatable (swinging) about a pivot point 218 of the hinge assembly 202. The key plate arm 204 can be coupled to the hinge assembly 202 using a pin 220. The pin 220 can be inserted through one or more through holes (not shown) of the key plate arm 204 and the hinge assembly 202.

The key plate arm 204 can include the plunger 222. The plunger 222 can be positioned at the second end 216 of the key plate arm 204. In some examples, the key plate arm 204 and the plunger 222 can form a single contiguous body. The plunger 222 can include a first end 224 and a second end 226 opposite to the first end 224. The first end 224 of the plunger 222 can be coupled to the key plate arm 204. The second end 226 of the plunger 222 can include an end plate 228.

The top cover 208 is positionally fixed with respect to the key plate arm 204. The top cover 208 can include a first end 230 and a second end 232 opposite to the first end 230. The compression spring 210 can be coupled to the top cover 208. Specifically, the compression spring 210 can be coupled to the first end 230 of the top cover 208. The compression spring 210 can further be coupled to the plunger 222, and specifically, coupled to the end plate 228 of the plunger 222. The compression spring 210 can be positioned between a portion 234 of the top cover 208 and the end plate 228, and further, located at the second end 216 of the key plate arm 204.

The microswitch 212 can include one or more microswitch actuators 236. The compression spring 210 can be in superimposition with one or more of the microswitch actuators 236. The compression spring 210 exerts a first force on the end plate 228 of the plunger 222 towards the microswitch actuator 236 such that the end plate 228 maintains contact with the microswitch actuator 236. That is, the distance between the end plate 228 of the plunger 222 and the microswitch actuators 236 is zero, or approximately zero. In some examples, the distance between the end plate 228 of the plunger 228 and the microswitch actuators 236 is less than 0.5 millimeters. In some examples, the compression spring 210 can exert the first force of approximately 3 gram-force (gf). In some examples, the compression spring 210 can exert the first force of approximately 4 gf.

To that end, the compression spring 210 can exert the first force on the end plate 228 of the plunger 222 less than a threshold force. For example, the threshold force can be a force to engage the microswitch actuator 236. That is, to engage (or depress) the microswitch actuator 236, a threshold force is to be applied to the microswitch actuator 236 to engage (or depress) such. In some examples, the microswitch actuator 236 can exert a second force on the end plate 226 of the plunger 222. The second force exerted by the microswitch actuator 236 can be directionally opposite to the first force applied by the compression spring 210 on the end plate 228 of the plunger 222. In some examples, the second force exerted by the microswitch actuator 236 is greater than the first force exerted by the compression spring 210. For example, the threshold force to engage (or depress) the microswitch actuator 236 can be approximately 65 gf. To that end, as the force required to engage (or depress) the microswitch actuator 222 (e.g., 65 gf) is greater than the first force exerted by the compression spring 210 (e.g., 3 gf), the plunger 222 does not engage (or depress) with the microswitch actuator 222 by the compression spring 210.

Figure 4:
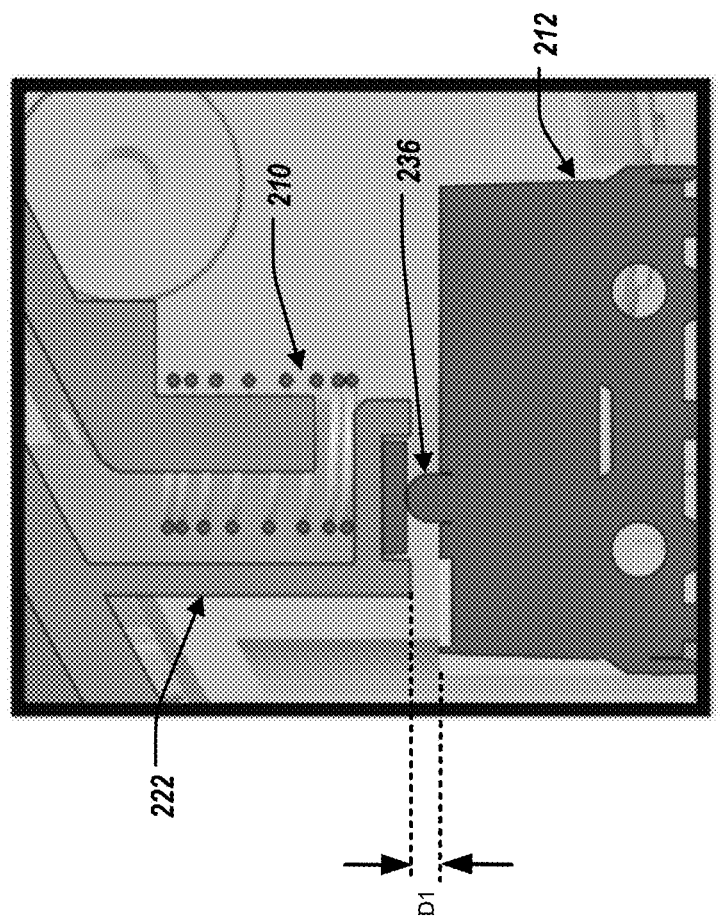
FIG. 4 illustrates a close-up view of a plunger in contact with a microswitch actuator of the portable mouse, in the first positional state.

In some examples, the key plate arm 204 can be rotatable between a first positional state and a second positional state. Specifically, as shown in FIGS. 3 and 4, the key plate arm 204 is in a first positional state. Specifically, when the key plate arm 204 is in the first positional state, the end plate 228 of the plunger 222 is a first distance D1 from the microswitch 212. For example, when the key plate arm 208 is in the first positional state, the portable mouse 200 is "unclicked." For example, when the key plate arm 208 is in the first positional state, the plunger 222 does not engage (or depress) the microswitch actuator 236. When the key plate arm 208 is in the first positional state, the plunger 222 does not engage (or depress) the microswitch actuator 236 while maintaining contact between the end plate 228 of the plunger 222 and the microswitch actuator 236. That is, when the key plate arm 208 is in the first positional state, the compression spring 210 applies the first force to the end plate 228 of the plunger 222 to maintain contact between the end plate 228 of the plunger 222 and the microswitch actuator 236 while not engaging (or depressing) the microswitch actuator 236 by the plunger 222. In some examples, when the key plate arm 204 is in the first positional state, a distance between the end plate 228 of the plunger 222 and the microswitch 212 is a height of the microswitch actuator 236.

Figure 5:
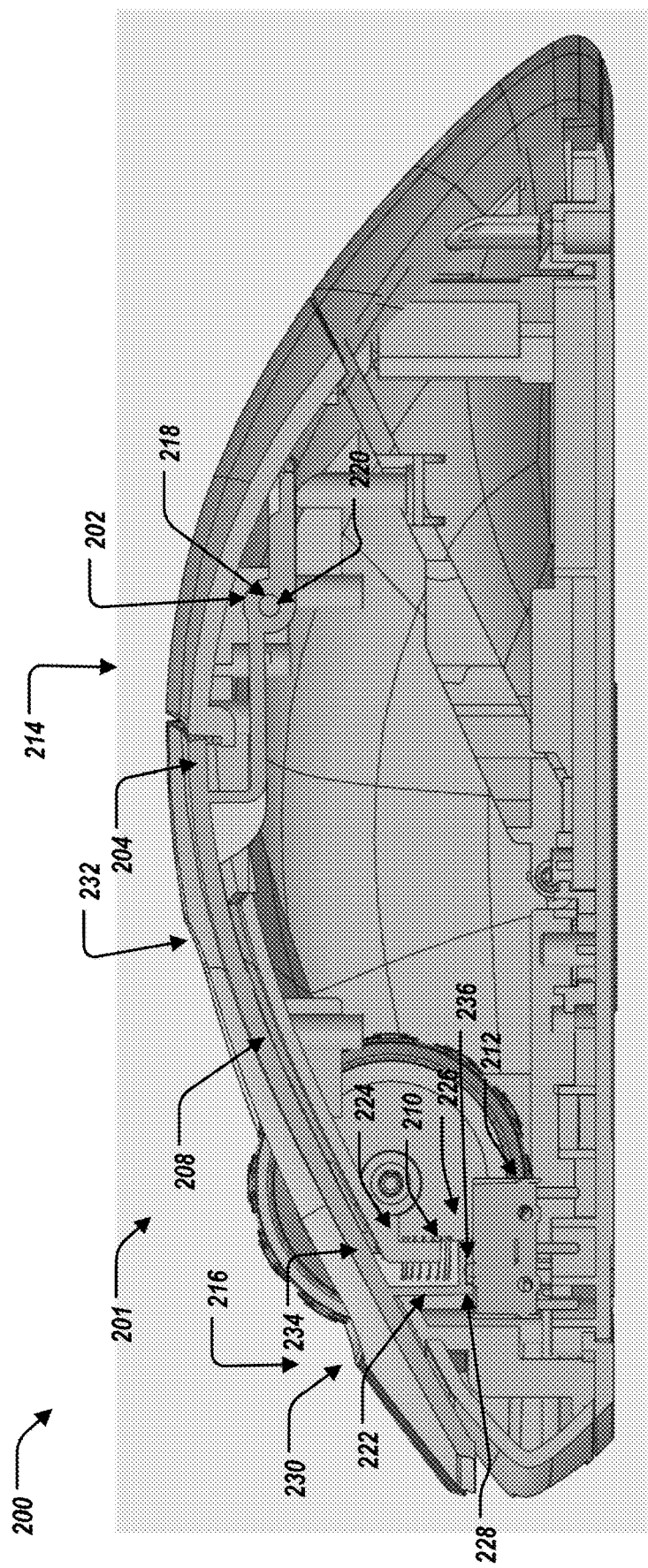
FIG. 5 illustrates a side cut-away view of the portable mouse, in a second positional state.
Figure 6:
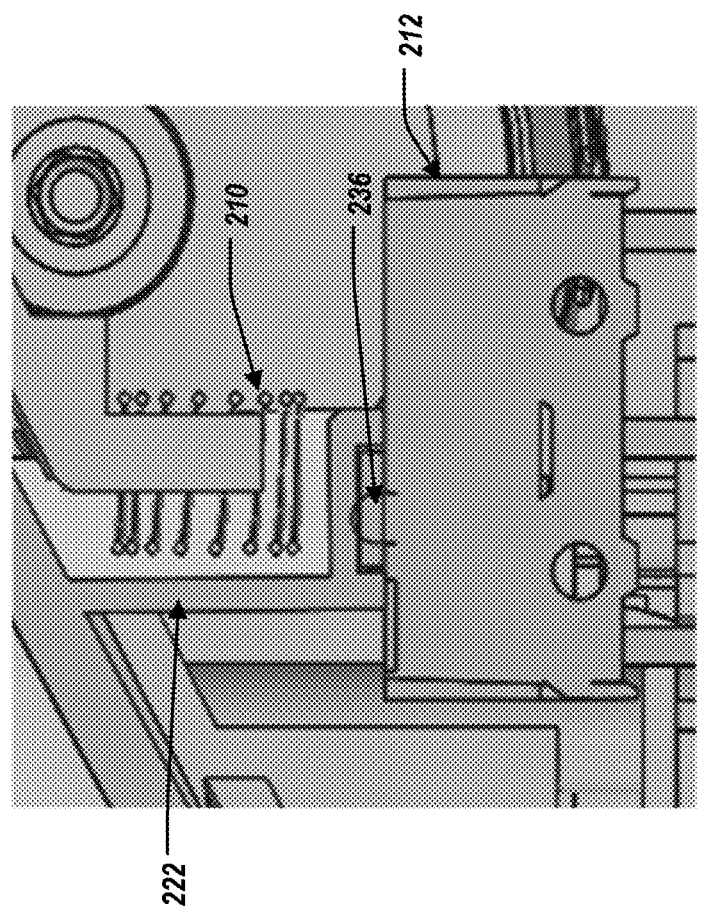
FIG. 6 illustrates a close-up view of the plunger in contact with the microswitch actuator of the portable mouse, in the second positional state.

As shown in FIGS. 5 and 6, when the key plate arm 204 is in the second positional state, the end plate 228 of the plunger 222 is a second distance D2 from the microswitch 212. In some examples, the first distance is greater than the second distance. In some examples, the second distance D2 is zero. For example, when the key plate arm 208 is in the second positional state, the portable mouse 200 is "clicked." For example, when the key plate arm 208 is in the second positional state, the plunger 222 engages (or depresses) the microswitch actuator 236. When the key plate arm 208 is in the second positional state, the plunger 222 engages (or depresses) the microswitch actuator 236 while maintaining contact between the end plate 228 of the plunger 222 and the microswitch actuator 236.

In some implementations, the portable mouse 200 can include a second mouse interaction mechanism (not shown) that includes a second hinge assembly, a second cantilever key plate arm, a second plunger, a second top cover, a second compression spring, and a second microswitch, similar to the hinge assembly 202, the cantilever key plate arm 204, the plunger 206, the top cover 208, the compression spring 210, and the microswitch 212, respectively. The portable mouse 200 can include the first mouse interaction mechanism 201 and the second mouse interaction mechanism to provide multiple interactions by the user with the portable mouse 200.

The portable mouse 200 can be utilized with the information handling system 100. Specifically, the portable mouse 200 can be configured to control an user interface element displayed by a display device that is coupled to a computing apparatus of the information handling system 100.

Figure 7:
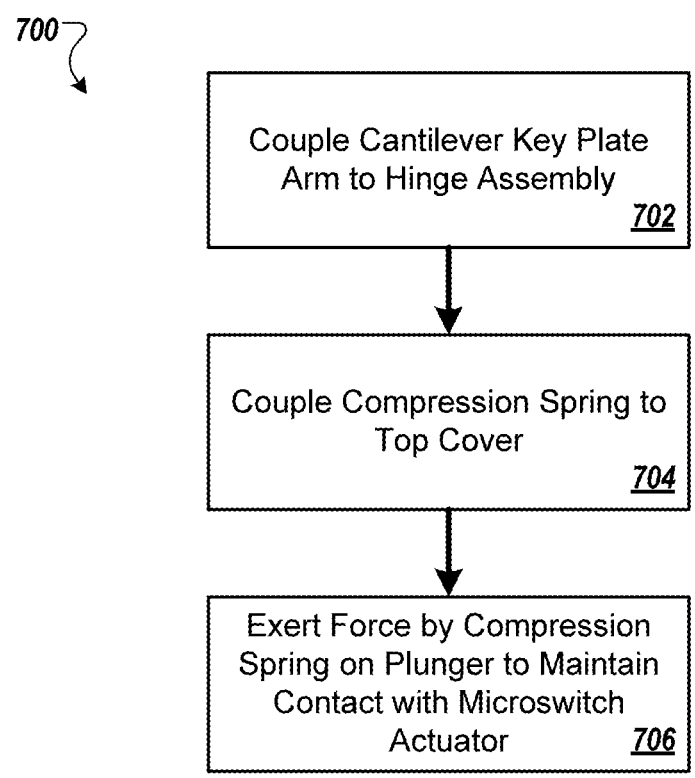
FIG. 7 illustrates a method of forming the portable mouse.

FIG. 7 illustrates a flowchart depicting selected elements of an embodiment of a method 700 for forming the portable mouse 200. The method 700 may be performed herein with reference to FIGS. 1-6. It is noted that certain operations described in method 700 may be optional or may be rearranged in different embodiments.

The cantilever key plate arm 204 is coupled to the hinge assembly 202 at the first end 214 of the cantilever key plate arm 204 (702). The compression spring 210 is coupled to the top cover 208 (704). The compression spring 210 exerts the first force on the end plate 228 of the plunger 222 such that the end plate 228 of the plunger 222 maintains contact with the microswitch actuator 236 of the microswitch 212.

Figure 8:
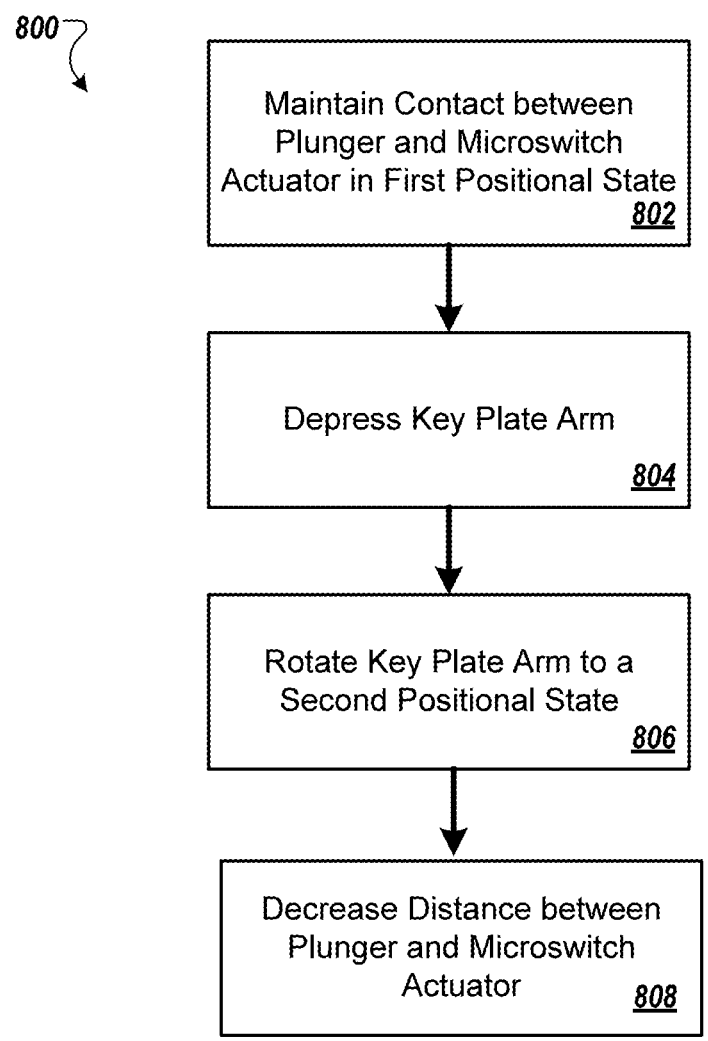
FIG. 8 illustrates a method of changing states of the portable mouse.

FIG. 8 illustrates a flowchart depicting selected elements of an embodiment of a method 800 for changing positional states of the portable mouse 200. The method 800 may be performed herein with reference to FIGS. 1-6. It is noted that certain operations described in method 800 may be optional or may be rearranged in different embodiments.

Contact is maintained between the end plate 228 of the plunger 222 and the microswitch actuator 226 when the cantilever key plate arm 204 is in the first positional state (802). The cantilever key plate arm 204 is depressed (804). In response to depressing the cantilever key plate arm 204, the cantilever key plate arm 204 is rotated about the hinge assembly 202 to place the key plate arm 204 in the second positional state (806). In response to rotating the cantilever key plate arm 204 about the hinge assembly 204, a distance between the end plate 228 of the plunger 222 and the microswitch actuator 236 is decreased (808).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A portable mouse, comprising:
   a hinge assembly;
   a cantilever key plate arm rotationally coupled to the hinge assembly at a first end of the cantilever key plate arm, the cantilever key plate arm including:
      a plunger at a second end of the cantilever key plate arm, the second end opposite to the first end, the plunger including an end plate;
   a top cover that is positionally fixed with respect to the cantilever key plate arm;
   a compression spring coupled as to surround a portion of the top cover such that the compression spring is positioned between another portion of the top cover and the end plate of the plunger; and a microswitch including a microswitch actuator, wherein the compressions spring exerts a first force on the end plate of the plunger such that the end plate of the plunger maintains contact with the microswitch actuator.

2. The portable mouse of claim 1, wherein the compression spring exerts the first force on the plunger less than a threshold force to engage the microswitch actuator.

3. The portable mouse of claim 1, wherein the cantilever key plate arm is rotatable between a first positional state and a second positional state, wherein when the cantilever key plate is in the first positional state, the end plate of the plunger is a first distance from the microswitch, and when the cantilever key plate is in the second position state, the end plate of the plunger is a second distance from the microswitch, the first distance being greater than the second distance.

4. The portable mouse of claim 3, wherein the end plate of the plunger maintains contact with the microswitch actuator in the first positional state and the second positional state.

5. The portable mouse of claim 3, wherein, when the cantilever key plate arm is in the first positional state, a distance between the end plate of the plunger and the microswitch is a height of the microswitch actuator.

6. The portable mouse of claim 3, wherein the microswitch actuator exerts a second force on the end plate of the plunger, the second force being greater than the first force that the compression spring exerts on the end plate of the plunger.

7. The portable mouse of claim 1, wherein the compression spring is located at the second end of the cantilever key plate arm.

8. The portable mouse of claim 1, wherein the compressions spring exerts the first force of three gram-force (gf).

9. An information handling system, comprising:
a computing apparatus;
a display device coupled to the computing apparatus;
a portable mouse configured to control a user interface element displayed by the display device, the portable mouse comprising:
a hinge assembly;
a cantilever key plate arm rotationally coupled to the hinge assembly at a first end of the cantilever key plate arm, the cantilever key plate arm including:
a plunger at a second end of the cantilever key plate arm, the second end opposite to the first end, the plunger including an end plate;
a top cover that is positionally fixed with respect to the cantilever key plate arm;
a compression spring coupled as to surround a portion of the top cover such that the compression spring is positioned between another portion of the top cover and the end plate of the plunger; and a microswitch including a microswitch actuator, wherein the compressions spring exerts a first force on the end plate of the plunger such that the end plate of the plunger maintains contact with the microswitch actuator.

10. The information handling system of claim 9, wherein the compression spring exerts the first force on the plunger less than a threshold force to engage the microswitch actuator.

11. The information handling system of claim 9, wherein the cantilever key plate arm is rotatable between a first positional state and a second positional state, wherein when the cantilever key plate is in the first positional state, the end plate of the plunger is a first distance from the microswitch, and when the cantilever key plate is in the second position state, the end plate of the plunger is a second distance from the microswitch, the first distance being greater than the second distance.

12. The information handling system of claim 11, wherein the end plate of the plunger maintains contact with the microswitch actuator in the first positional state and the second positional state.

13. The information handling system of claim 11, wherein, when the cantilever key plate arm is in the first positional state, a distance between the end plate of the plunger and the microswitch is a height of the microswitch actuator.

14. The information handling system of claim 11, wherein the microswitch actuator exerts a second force on the end plate of the plunger, the second force being greater than the first force that the compression spring exerts on the end plate of the plunger.

15. The information handling system of claim 9, wherein the compression spring is located at the second end of the cantilever key plate arm.

16. The information handling system of claim 9, wherein the compressions spring exerts the first force of three gram-force (gf).

17. A method of forming a portable mouse, comprising:
coupling a cantilever key plate arm to a hinge assembly at a first end of the cantilever key plate arm, the cantilever key plate arm including a plunger at a second end of the cantilever key plate arm, the second end opposite to the first end, the plunger including an end plate; and
coupling a compression spring to surround a portion of a top cover that is positionally fixed with respect to the cantilever key plate arm, the compression spring positioned between another portion of the top cover and the end plate of the plunger,
wherein the compression spring exerts a first force on the end plate of the plunger such that the end plate of the plunger maintains contact with a microswitch actuator of a microswitch.

* * * * *